United States Patent [19]
Lewis et al.

[11] 3,961,150
[45] June 1, 1976

[54] STERILIZATION APPARATUS

[75] Inventors: Peter Sydney Lewis, Murrumbeena; Franklin Marius Lohning, North Balwyn, both of Australia

[73] Assignee: Tarax Pty. Limited, Huntingdale, Australia

[22] Filed: Mar. 13, 1974

[21] Appl. No.: 450,922

[30] Foreign Application Priority Data
Mar. 14, 1973 Australia............................ 2597/73

[52] U.S. Cl................. 219/10.49; 21/102 R; 219/10.71; 426/406
[51] Int. Cl.²........................................... H05B 5/04
[58] Field of Search........... 219/10.49, 10.41, 10.57, 219/10.67, 10.69, 10.71, 10.73, 10.75, 10.77; 21/102 R; 426/234, 397, 406, 405

[56] References Cited
UNITED STATES PATENTS

| | | | |
|---|---|---|---|
| 932,242 | 8/1909 | Berry | 219/10.49 |
| 1,646,498 | 10/1927 | Seede | 219/10.41 X |
| 2,355,887 | 8/1944 | Moule | 219/10.75 X |
| 2,400,472 | 5/1946 | Strickland | 219/10.41 |
| 2,607,698 | 8/1952 | Martin | 426/405 |
| 2,945,935 | 7/1960 | Messner et al. | 219/10.41 |
| 3,071,478 | 1/1963 | Cheftel et al. | 426/406 |
| 3,080,468 | 3/1963 | Wuczkowski | 219/10.67 X |
| 3,786,220 | 1/1974 | Harnden | 219/10.49 |
| 3,786,222 | 1/1974 | Harnden et al. | 219/10.49 |

FOREIGN PATENTS OR APPLICATIONS

| | | | |
|---|---|---|---|
| 268,750 | 12/1965 | Australia | 219/10.73 |
| 737,144 | 6/1966 | Canada | 219/10.71 |

*Primary Examiner*—Bruce A. Reynolds
*Attorney, Agent, or Firm*—Sughrue, Rothwell, Mion, Zinn & Macpeak

[57] ABSTRACT

This invention relates an apparatus for sterilizing the contents of sealed containers which containers comprise electrically conductive material, the apparatus comprising support means to support containers and to rotate them first in one sense and then in the opposite sense to impart substantial relative motion between the containers and their contents, and induction heating means to heat the rotating containers whereby sterilizing heat is rapidly imparted to the contents of the containers.

28 Claims, 5 Drawing Figures

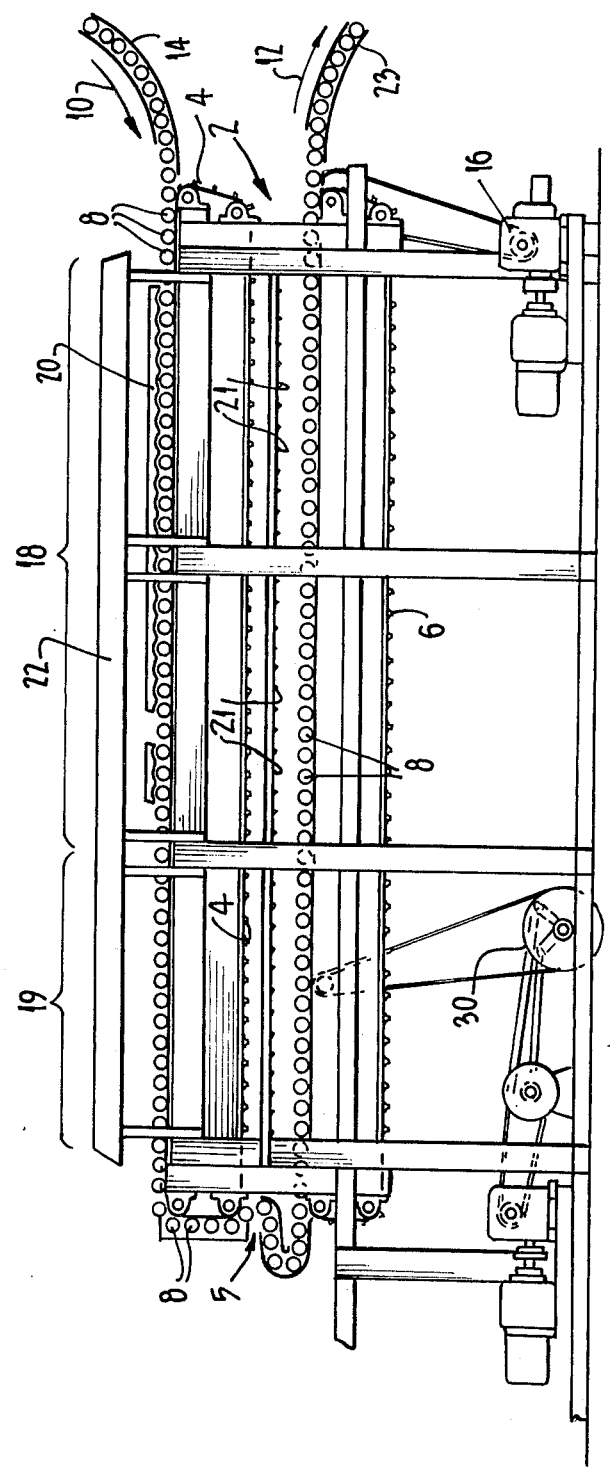

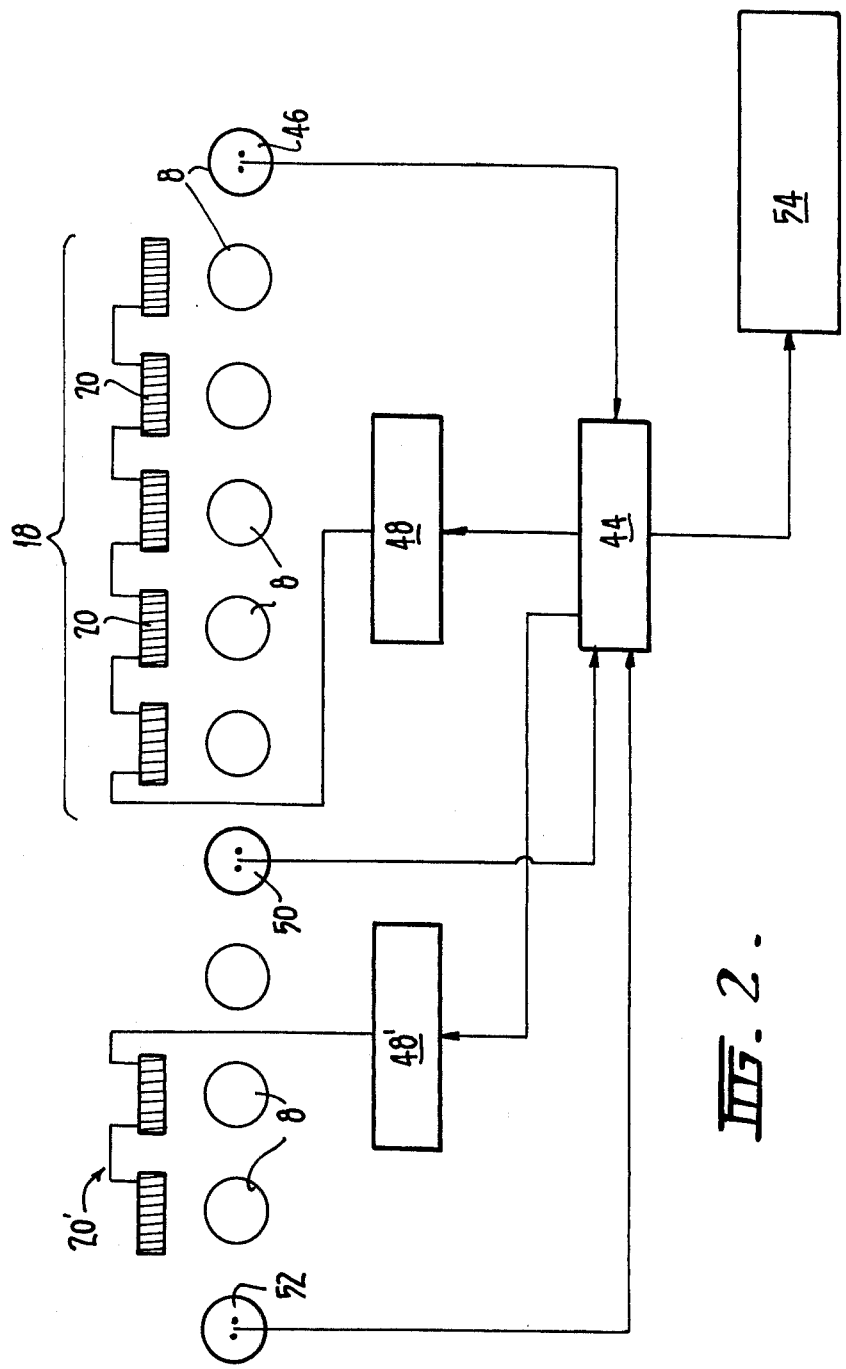

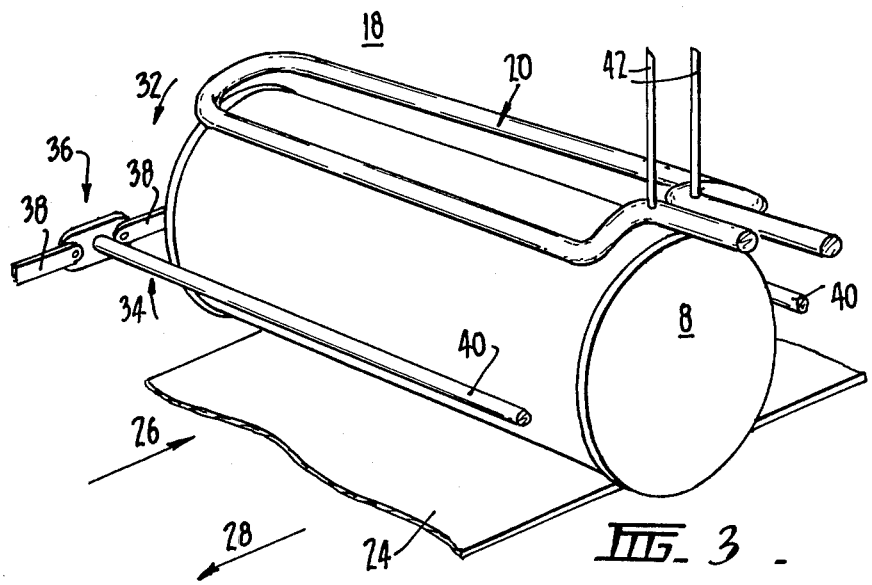
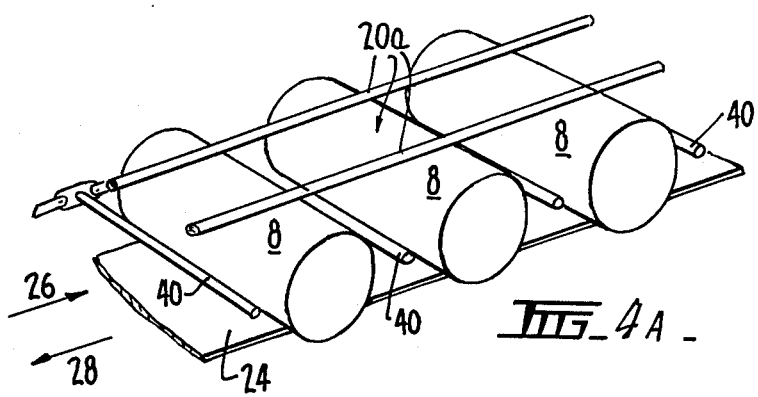
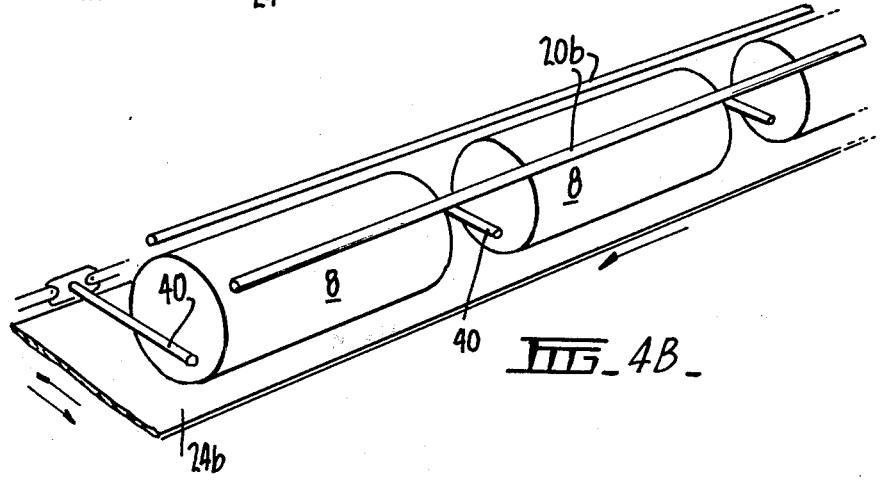

STERILIZATION APPARATUS

This invention relates to sterilization of foods and liquids contained within sealed containers.

Known methods of sterilizing food products in sealed containers, particularly canned products, usually involve heating the containers within pressurized chambers. Means is sometimes provided to agitate the containers during heating the process to agitate the contents to provide a better heat distribution in the containers, the process is, nevertheless, relatively time consuming and not readily adaptable to be a continuous process. Further the chambers are bulky and expensive.

A recent significant improvement in sterilization of foodstuffs in sealed cans is described in U.S. Pat. No. 3,071,478 issued 1st Jan., 1963 to H. Cheftel and M. Beauvais. In that process moving cans are subjected to a flame of fuel gas, and, because of the relatively high temperature of the flame, the contents of the can heat quickly, thereby shortening the processing time. The process can be made continuous by feeding the cans through the heating zone on a conveyor.

In Australian Pat. No. 268,750 there is disclosed an apparatus in which cans are rotated alternately backwards and forwards as they traverse through a heating zone. The motion is such that significant relative movement between the can and its contents is established thereby affording better heat transfer to and within the contents.

While the apparatus described in Australian Pat. No. 268,750 is a significant improvement over that disclosed in the U.S. Pat. No. mentioned above, the apparatus still suffers several drawbacks, and it is the object of the present invention to overcome these drawbacks.

The first drawback is that the parts of the apparatus must be capable of withstanding the effects of openly burning gas flames. This problem is particularly concentrated upon the conveyor and agitator mechanism which carries the containers. Many of the components must be made from heat resistance metals and be made heavier than would be the case if mechanical stresses alone were to be allowed for in order to increase their thermal capacities to avoid localized overheating and to allow for gradual surface deterioration caused by the flames. Despite this, parts which we are subjected to the flames require not infrequent replacement which adds to maintenance costs and lost production time. Further, the design problems in coping with very high thermal expansions to which parts of the apparatus are subjected in varying degrees adds to the production cost of the apparatus.

Further, in machines constructed in accordance with Australian Pat. No. 268,750 the containers are reciprocated by means of reciprocating plates which are necessarily made of metal so as to withstand the high temperature of the openly burning flames. The containers simply rest upon the bars and rely upon frictional engagement therewith for their rotation. At higher rates of reciprocation or longer reciprocating strokes slip is likely to occur because of the low fricational engagement of the containers with the metallic plates.

The second drawback is the difficulty of controlling the heating when gas flames are used. It is important to ensure that the contents of the containers attain the correct sterilizing temperature and held at that temperature for a sufficient period. The actual temperature and period depend upon the nature of the goods to be processed, as is well understood in the art. If the temperature is too high or the period too long the goods may be burnt and/or have their colour, taste, consistency, nutrient value or odour adversely affected. On the other hand, if the temperature is too low or the period too short, sterilization will be incomplete leaving potentially dangerous bacteria in the containers.

When the apparatus is started up much of the heat input goes into heating the apparatus itself and further it takes a relatively long period for the various parts of the machine to reach their equilibrium temperatures. Unless elaborate control systems are employed, operation before equilibrium has been attained may result in incomplete sterilization. Further, ambient temperature variations will affect the thermal equilibrium of the apparatus and could result in too much or too little heat being applied to the containers. It is difficult to bring about rapid changes in the quantity of heat to be supplied to the cans because of the thermal capacity of the machine itself.

Further, a significant proportion of the heat absorbed by the containers is from direct infrared radiation from the flame and thus the surface properties of the containers are very important in affecting the quantity of heat absorbed. Normally the containers are cans, and it is customary to process the cans after the exterior of the can have been printed upon. The printing on the surface will affect the capacity of the surface to absorb heat from a radiant source having the result that the thermal behaviour of the can depends upon the printing on its surface. This, of course, makes control of the sterilization process even more difficult. Further, frequently the cans have printing some parts of which are highly radiation absorbent and others are highly reflective making heat input to the can non-uniform and possibly leading to regions of over and under heating of the product.

A further temperature control problem arises in flame machines when there is a break in the usually continuous line of containers passing through the flame heating zone. Normally the containers are closely spaced side by side and the gas flame plays directly upon the undersides of the containers, the main burning front of the flame being centred below the containers with exhaust gases and the upper reaches of the flame entering the spaces between adjacent containers. When, however, there is a break in the line of containers the flame is permitted to burn much higher than usual and most of its heat is lost. Consequently those containers next in line to the break or gap receive considerably less heat than is required for adequate processing. Deficiencies of about 10°F in the final temperature of the product can occur in this way, and a difference of this order would almost certainly means that sterilization is incomplete. The product would need to be held at the lower temperature for about 15 times as long as usual for complete sterilization.

A further drawback is the amount of energy that is lost, in heating the apparatus and its surroundings compared with the amount of energy absorbed by the containers. In addition, the apparatus can only be used where a ready supply of industrial gas is available.

We have found that the drawbacks mentioned above are materially overcome in an apparatus in accordance with the invention wherein rapid heating of containers is effected by exposing them to a high frequency magnetic field.

More particularly the invention provides apparatus for sterilizing the contents of sealed containers which containers comprise electrically conductive material, the apparatus comprising support means to support containers and to rotate them first in one sense and then in the opposite sense to impart substantial relative motion between the containers and their contents, and induction heating means to heat the rotating containers whereby sterilizing heat is rapidly imparted to the contents of the containers.

Induction heating is, of course, a method of heating metallic bodies which is used often enough in industry. For example, Canadian Pat. No. 737,144 discloses an arrangement for sterilizing empty cans; U.S. Pat. No. 2,945,935 discloses an arrangement for evaporating moisture from boxes of cans; and Australian Pat. No. 258,421 discloses an arrangement for warming food in open metallic trays. The level of power input in these machines is insufficient to enable product sterilization, and since there is no means for effecting rapid heat flow to the product, the mere increase in power input would result in over heating of the containers and damage to their contents. We have found that by moving the containers in a reciprocating rotating fashion and applying an inductive field to generate heat in the containers at a substantial power level, sufficient heat can be generated in the containers and then transferred to their contents to effect rapid sterilization of the contents whilst, at the same time overcoming the drawbacks mentioned earlier.

Normally the containers to be processed in the apparatus of the invention will comprise cans but alternatively may be made from non-metallic material such as glass or plastic material and have metal particles embodied therein or applied to the surfaces thereof so that the containers, when subjected to the magnetic field produced by the induction heating means, will have eddy currents generated therein, whereby the container will be heated. The heat is generated directly within the container so that heat input is localized in the container and making the heating process easier to control and more efficient. This arrangement substantially overcomes all of the drawbacks mentioned above in relation to the prior art apparatus. In particular the first drawback is overcome because the apparatus itself is not heated to a significant extent. Its construction may be simplified by forming many components from synthetic material. In particular the cans could be supported upon a flexible belt of synthetic material and the belt reciprocated to produce alternate rotation of the cans, a construction which is a very much simpler than that employed in an open flame environment.

The second drawback is materially reduced because heat application to the container can be easily controlled by varying the intensity of the magnetic field the affects of which are almost instantaneous or by altering the period for which the containers are subjected to the field. Further, input to the containers is independent of their surface printing, and heat input is not influenced by gaps in a line of containers presented to the heating front. Lastly, the process is more efficient because the heating is confined to the containers themselves.

The invention further provides a method of sterilizing the contents of sealed containers which comprise electrically conductive material, comprising the steps of continuously rotating the containers first in one sense and then in the opposite sense to effect substantial relative movement between the container and its contents and simultaneously subjecting the container to a high frequency magnetic field to generate heat within the container, which heat is rapidly transferred to the contents of the container thereby effecting a substantial rate of increase in temperature thereof.

Advantageously the coils from which the field emanates are disposed close to the containers to improve magnetic coupling therewith, and in this regard it may be desirable in some circumstances to halt the conveyor at discrete locations through the apparatus to allow the coils to be positioned very close to the containers to improve coupling. In some cases the coils can be shaped so as to follow the contours of the surface of the containers.

The invention will now be further described with reference to the accompanying drawings in which:

FIG. 1, shows a side view of a sterilizing machine embodying the invention,

FIG. 2, is a schematic view of the temperature control arrangement of the machine illustrated in FIG. 1, FIG. 3 is a more detailed view of the machine showing diagrammatically a can on a conveyor and the disposition of an induction coil relative to the can, FIGS. 4a and 4b show modified arrangements of the apparatus illustrated in FIG. 1, The machine illustrated in FIG. 1 comprises a main frame 2 supporting an upper conveyor 4 and a lower conveyor 6. The conveyors 4 and 6 convey cans 8 through the machine in the direction of arrows 10 and 12 respectively. The arrangement could be such as to process any number of cans in parallel by providing the appropriate number of parallel tracks as is well known in the art.

The upper conveyor receives filled and sealed cans from a preheating stage (not shown) via an input guide 14. The preheating temperature is variable in accordance with the product but may be of the order of 185°F. The upper and lower conveyors 4 and 6 are driven in synchronsim by a variable speed drive 16 mounted near the base of the main frame. Intermittent or step wise movement of the conveyors can be achieved by including an elliptical gear train or geneva wheel in the output of the variable speed drive 16 for a purpose that will be explained later.

Rapid heating of the cans 8 is effected in a heating zone 18 by means of a main array of induction coils 20 mounted above the conveyor 4 and beneath a canopy 22. The cans then enter a holding zone 19 where the peak temperature attained on leaving the heating zone 18 is maintained for a predetermined period which depends upon a number of factors including the type of product being processed and peak temperature attained (reference is made to a publication "FLAME STERILIZATION, Specialist Courses for the Food Industry No. 2" published by the Commonwealth Scientific and Industrial Research Organisation, 1972). From the holding zone 19 the cans pass from the upper conveyor 4 to the lower conveyor 6 by way of transfer guide 5. Above the entire length of the conveyor 6 are disposed spray nozzles 21 for spraying water onto the cans to cool them, this region of the machine being the familar cooling zone. At the end of the conveyor 6 are outlet guides 23 for carrying the processed cans to packaging apparatus (not shown).

In the heating zone 18 the cans are rotated back and forth about axes which are transverse to the direction of movement of the conveyors to establish a substantial degree of relative movement between the cans and their contents and within the contents themselves. In this way heat generated in the cans is rapidly transferred to the contents and distributed within the contents thereby avoiding overheating of the can and burning of the contents in contact therewith. The machine is capable of attaining a temperature gradient of up to 5°F per second; a useful range being from 0.5° to 5°F per second. To sustain such a temperature gradient the coils 20 must be capable of delivering at least about 10 kw for every kilogram of contents processed (assuming specific heat and gravity of the product are approximately unity). The frequency of reverse rotation and the angular "stroke" can be varied according to how much agitation various products require for good heat penetration or can tolerate without deterioration. A suitable range of reversals would be from about 10 to 120 per minute but the range from 40 to 60 per minute is suitable for most products. The angular stroke may vary from 180° to 720°.

FIG. 3 shows in more detail a portion of the heating zone 18 of the machine. The can 8 rests upon a belt 24 composed of synthetic plastics material or rubber, which belt is made to reciprocate in the directions of arrows 26 and 28 by means of a reciprocating drive mechanism 30 mounted near the base of the frame 2 of the machine. The plastics material or rubber of the belt 24 ensures good frictional engagement with the cans 8; the need for good frictional engagement becoming more important at higher rates of reciprocation and for longer angular strokes. Movement of the belt 24 in the direction of arrows 26 and 28 will produce rotation of the cans 8 in the direction of arrows 32 and 34 respectively, the angular velocity and angular stroke depending upon the velocity and stroke of the belt 24. The conveyor 4 includes a pair of chain structures one of which is indicated by the reference numeral 36. The chain structures 36 are made from links 38 of synthetic plastics material pivoted together, and extending between the chain structures 36 are carrier bars 40 also of synthetic plastics material. The cans 8 are located between adjacent carrier bars 40 and are conveyed through the machine by engagement therewith.

FIG. 3 also shows one form for which the coils 20 may take. In this form, the coil is generally U-shaped and is formed from copper tubing. Electrical connections to the coil are by way of leads 42. Water is circulated within the tubing to prevent over heating of the coil itself. The coil 20 is disposed close to the upper side of the can 8 to ensure good magnetic coupling therewith. Where the variable speed drive 16 includes an elliptical gear train or geneva wheel, it is arranged to halt movement of the chain structures 36 at those times when the cans 8 are directly beneath the coils 20 thereby increasing the period of good magnetic coupling. Of course, whilst the can 8 is beneath the coil 20, reverse rotation of the can is effected by the belt 24 otherwise overheating of the can or its contents may occur. The belt 24 can operate continuously or be operated in synchronism with the conveyor 4 so that it only reciprocates the cans whilst directly under the coils 20. The former operation is however preferred because it assists in promoting uniform heat distribution within the contents of the cans. Means (not shown) may be provided to lower the coils 20 so that they are very closely spaced to the surface of the cans to improve coupling. In such a case the coils 20 could be shaped so that they partially envelop the can to further improve coupling.

An alternative arrangement is illustrated in FIG. 4a. In this arrangement coils are in the form of long conductors 20a which run parallel to the conveyor 4. In FIG. 4b the coils 20b are the same as those illustrated in FIG. 4a, however, the cans 8 are disposed with their axes parallel to the conveyor 4 and the belt 24b reciprocates in a direction transverse to the direction of movement of the conveyor so that they rotate about axes which are parallel to the direction of movement of the conveyor 4.

FIG. 2 shows schematically the temperature control system of the machine. The system includes a controller 44 into which the canner can introduce data concerning the product to be sterilized such as the peak temperature to be attained, frequency and strokes of reciprocation required, weight and specific heat and gravity of the product. The system includes a contact thermocouple 46 which is resiliently urged into contact with the ends of the cans on entry to the heating zone 18. The initial temperature reading sensed by the thermocouple 46 is fed to the controller 44 so that it can then compute the magnitude of the current to be generated by a main RF generator 48 and applied to the main induction coils 20. It also computes the speed of the conveyors 4 and 6.

After leaving the heating zone 18 the temperature of each can 8 is sensed by a second contact thermocouple 50 and this temperature reading is fed to the controller 44. This temperature is compared with the required peak temperature and if a deficiency is detected appropriate signals are applied to an auxiliary RF generator 48' to supply current to auxiliary coils 20'. The temperature of each can 8 is again sensed by a third contact thermocouple 52 and this final temperature reading is fed through the controller 44 to a chart recorder 54 to provide a permanent record of the peak temperature attained by each can processed in the machine.

The frequency of operation of the generators 48 and 48' is not really critical upon the process. A practical lower limit is about 5kHz where magnetic coupling becomes very poor. About 0.4MHz is a useful frequency because of the available equipment of this frequency. Beyond 50 MHz the equipment would become too expensive to be economically useful. Whilst the forgoing machine has been described in relation to the processing of canned goods it is not necessarily limited thereto. For instance $Na_2O$ and other additives can be added to glass containers to increase its conductivity thereby making containers made from such glass susceptible to heating by magnetic induction. Alternatively the glass surface could be metalized to achieve a similar effect and in this case it is preferred that the metal is applied in bands so that the contents are still clearly visible.

The principle disclosed herein can be used not only for sterilizing and pasteurising but also for heating cans of product. It can therefore be used for rapid and uniform heating of sealed cans of product in commercial shops, restaurants, etc., whereby cans of soup and other similar items can be rapidly reheated to a preset serving temperature.

It also has considerable application for vending machines for preparing hot soup, hot chocolate drink and similar products for sale to the public. The machine being entirely electric it can be plugged into a standard wall outlet and can be located in corridors, vestibules, shop fronts, etc., where gas flame heating would not be allowed because of fire risks and gas safety regulations.

Many modifications will be apparent to those skilled in the art without departing from the spirit of the invention as defined in the appended claims.

We claim:

1. Apparatus for sterilizing the contents of sealed containers which containers comprise electrically conductive material, the apparatus comprising support means to support containers and to rotate them first in one sense and then in the opposite sense to impart substantial relative motion between the containers and their contents, and induction heating means disposed in close proximity to said rotating containers to heat the rotating containers to rapidly heat the contents of the containers to the heat of sterilization.

2. Apparatus as claimed in claim 1 wherein said induction heating means comprises a radio frequency generator connected to induction heating coils disposed above the support means.

3. Apparatus as claimed in claim 2 wherein the radio frequency generator produces currents in said coils in the range of 5kHz to 50 MHz.

4. Apparatus as claimed in claim 2 wherein the power output of the radio frequency generator is such as to effect a temperature rise rate of the contents of from 0.5°F to 5°F per second.

5. Apparatus as claimed in claim 4 wherein said power output is approximately 10 kw per kilogram of contents being processed by the apparatus.

6. Apparatus as claimed in claim 1 wherein the support means comprises a conveyor means for conveying the containers successively beneath said coils and reciprocating means for alternately rotating the containers in opposite senses about axes which are transverse with respect to the conveyor means.

7. Apparatus as claimed in claim 6 wherein the reciprocating means reciprocates the containers at a rate of from 10 to 120 reversals per minute.

8. Apparatus as claimed in claim 7 wherein said rate is from 40 to 60 reversals per minute.

9. Apparatus as claimed in claim 6 wherein the conveyor means comprises a chain structure composed of a plurality of link members pivoted together, said link members comprising synthetic plastics material, and wherein said reciprocating means comprises a belt structure comprising synthetic plastics material.

10. Apparatus as claimed in claim 6 including means to halt the conveyor means at selected positions corresponding to positions in which the containers are directly beneath respective induction heating coils.

11. Apparatus as claimed in claim 1 including temperature sensing means to sense the temperature of the containers after heating thereof by the induction heating means, and control means responsive to the temperature sensing means to adjust the magnitude of the current in the coils to effect temperature control of the containers.

12. Apparatus as claimed in claim 11 wherein the induction heating coils comprise a main group of coils and an auxiliary group of coils and the control means is operable to adjust the current in the auxiliary group of coils in response to said temperature sensing means.

13. Apparatus as claimed in claim 12 including an auxiliary radio frequency generator for supplying current to the auxiliary group of coils.

14. Apparatus as claimed in claim 13 including second temperature sensing means to sense the temperature of the containers prior to heating thereof by the induction heating means and a control device responsive to said second temperature sensing means said control device being operable to control the magnitude of current in the main group of coils.

15. Apparatus as claimed in claim 11, wherein said temperature sensing means comprises
a contact thermocouple resiliently urged towards the containers to contact their ends.

16. Apparatus for sterilizing the contents of sealed containers which containers comprise electrically conductive material, the apparatus comprising,
a frame, an induction heating zone comprising induction heating coils supported on the frame,
a radio frequency generator connected to said induction heating coils,
conveyor means supported by the frame for conveying containers through said induction heating zone, the conveyor means supporting the containers in proximity to said induction heating coils,
reciprocating means supported by the frame for reciprocating the containers carried by the conveyor means about axes which are transverse to the direction of travel of the conveyor means.

17. Apparatus as claimed in claim 16 including a holding zone for maintaining the elevated termperature of the containers and their contents produced in the induction heating zone, and wherein said conveyor means and reciprocating means continue through the holding zone to convey and reciprocate containers therein.

18. Apparatus as claimed in claim 17 including temperature sensing means for sensing the temperature of the containers between the induction heating and holding zones, and control means responsive to the temperature sensitive means to adjust the speed of the conveyor means or the magnitude of the current delivered by the radio frequency generator to thereby adjust the heat input to the containers and thus attain a predetermined temperature of the containers entering the holding zone.

19. Apparatus as claimed in claim 18 wherein there is provided an auxiliary array of induction coils supported on the frame between the heating zone and the holding zone, and an auxiliary radio frequency generator connected to said auxiliary coils, said control means being operable to control the magnitude of the current generated by said auxiliary generator whereby the containers attain said predetermined temperature.

20. Apparatus as claimed in claim 18 further including a cooling zone located beneath the induction heating and holding zones, said conveyor means having a first run for conveying the containers through the induction heating and holding zones and a second run for conveying the containers through the cooling zone and a transfer mechanism for transfer containers from the first run to the second run, said cooling zone having an array of water spray nozzles supported by the frame for spraying cooling water upon the containers in the cooling zone.

21. Apparatus as claimed in claim 20 including further reciprocating means for effecting alternate rotation of the containers on the second run of the conveyor means about axes which are transverse to the direction of movement of said second run.

22. A method of sterilizing the contents of sealed containers which comprise electrically conductive material, comprising the steps of continuously rotating the containers first in one sense and then in the opposite sense to effect substantial relative movement between the container and its contents simultaneously subjecting the container to a high frequency magnetic field to generate heat within the container, which heat is rapidly transferred to the contents of the container thereby effecting a substantial rate of increase in temperature thereof.

23. A method as claimed in claim 22 wherein the frequency of the magnetic field is in the range 5 kHz to 50 MHz.

24. A method as claimed in claim 22 wherein rotation in said one and opposite senses is in the range from 10 to 120 reversals per second.

25. A method as claimed in claim 22 wherein the rate of heating of the contents is in the range from 0.5 to 5.0°F per second.

26. A method as claimed in claim 25 wherein the rate heat generated in the containers is approximately 10 kw per kilogram of contents being processed.

27. A method as claimed in claim 22 including the steps of sensing the temperature of the containers after being heated by said field, comparing the temperature so obtained to a predetermined value, and subjecting the containers to a further high frequency magnetic field if said temperature is less than said predetermined value.

28. A method as claimed in claim 22 including the step of sensing the temperature of the containers prior to application of said field and altering the intensity of said field in accordance with the temperature sensed to thereby control the amount of heat generated in, and thus the temperature of, the containers.

* * * * *